United States Patent
Shi et al.

(10) Patent No.: US 9,008,583 B2
(45) Date of Patent: Apr. 14, 2015

(54) METHOD FOR REPORTING MEASUREMENT RESULTS IN CARRIER AGGREGATION AND USER EQUIPMENT

(75) Inventors: Xiaojuan Shi, Shenzhen (CN); Yada Huang, Shenzhen (CN); Yun Deng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 178 days.

(21) Appl. No.: 13/259,450

(22) PCT Filed: Jun. 11, 2010

(86) PCT No.: PCT/CN2010/073787
§ 371 (c)(1),
(2), (4) Date: Dec. 22, 2011

(87) PCT Pub. No.: WO2010/148961
PCT Pub. Date: Dec. 29, 2010

(65) Prior Publication Data
US 2012/0094608 A1    Apr. 19, 2012

(30) Foreign Application Priority Data
Jun. 24, 2009   (CN) .......................... 2009 1 0139713

(51) Int. Cl.
*H04B 17/00* (2006.01)
*H04W 24/10* (2009.01)
(Continued)

(52) U.S. Cl.
CPC ............. *H04W 24/10* (2013.01); *H04L 1/0028* (2013.01); *H04L 5/001* (2013.01); *H04L 1/0026* (2013.01)

(58) Field of Classification Search
CPC ..... H04L 1/0026; H04L 1/0028; H04L 5/001; H04W 24/10

USPC .................................................... 455/67.11
See application file for complete search history.

(56) References Cited

U.S. PATENT DOCUMENTS

| | | |
|---|---|---|
| 2008/0064384 A1 | 3/2008 | Okita et al. |
| 2010/0120431 A1* | 5/2010 | Hwang et al. ................ 455/436 |

(Continued)

FOREIGN PATENT DOCUMENTS

| | | |
|---|---|---|
| CN | 1832621 A | 9/2006 |
| CN | 101052227 A | 10/2007 |

(Continued)

OTHER PUBLICATIONS

P.R. China, State Intellectual Property Office, International Search Report for International Application No. PCT/CN10/73787, mailed Sep. 23, 2010.

(Continued)

*Primary Examiner* — David Bilodeau
(74) *Attorney, Agent, or Firm* — Bright IP Law Offices (57) ABSTRACT

A method and user equipment for reporting a measurement result in carrier aggregation are provided. The method for reporting the measurement result of carrier aggregation includes: the user equipment reporting a measurement report which carries measurement results of part of or all of component carriers in a same carrier-aggregation cell. With the invention, the problem that a network cannot correctly evaluate the channel quality of a carrier-aggregation cell because the network can only acquire the measurement result on a single component carrier is resolved. The present invention further can assure a service quality when the UE performs handover between cells of carrier aggregation, and satisfy good performance of UE mobility between carrier-aggregation cells.

10 Claims, 3 Drawing Sheets

(51) Int. Cl.
*H04L 1/00* (2006.01)
*H04L 5/00* (2006.01)

(56) References Cited

U.S. PATENT DOCUMENTS

| | | | | |
|---|---|---|---|---|
| 2010/0222060 A1* | 9/2010 | Zhang et al. | ............... | 455/436 |
| 2010/0272209 A1* | 10/2010 | Lee et al. | ............... | 375/295 |
| 2010/0296471 A1* | 11/2010 | Heo et al. | ............... | 370/329 |
| 2010/0296473 A1* | 11/2010 | Kim et al. | ............... | 370/329 |
| 2011/0081856 A1* | 4/2011 | Johansson et al. | ............... | 455/7 |
| 2011/0134831 A1* | 6/2011 | Pirskanen | ............... | 370/328 |
| 2011/0237202 A1* | 9/2011 | Uemura et al. | ............... | 455/67.14 |
| 2011/0250918 A1* | 10/2011 | Jen | ............... | 455/509 |
| 2011/0274099 A1* | 11/2011 | Kwon et al. | ............... | 370/338 |
| 2011/0317577 A1* | 12/2011 | Yamada et al. | ............... | 370/252 |
| 2012/0002643 A1* | 1/2012 | Chung et al. | ............... | 370/331 |
| 2012/0046066 A1* | 2/2012 | Tamura et al. | ............... | 455/525 |

FOREIGN PATENT DOCUMENTS

| | | | |
|---|---|---|---|
| CN | 101111071 A | 1/2008 |
| CN | 101340641 A | 1/2009 |
| CN | 101505469 A | 8/2009 |
| EP | 1751966 B1 | 12/2007 |

OTHER PUBLICATIONS

Cao, Gen et al. Multi-carriers Aggregation Technology in LTE-Advanced System, Modern Science & Technology of Telecommunication, Feb. 2009 vol. 02 (Feb. 28, 2009), pp. 48-51.

Cheng, Shun Chuan et al. Research on the Performance of Carrier Aggregation Technology in LTE-Advanced System, Modern Science & Technology of Telecommunication, Apr. 2009 vol. 04 (Apr. 30, 2009), pp. 53-56, 73.

Cheng, Shun Chuan et al. Application of Carrier Aggregation Technology in LTE-Advanced System, Mobile Communications, Apr. 2009 (the second half) (Apr. 30, 2009), pp. 52-55.

English translation of abstract of CN 101111071 (1 pg.).

English translation of abstract of CN 101340641 (1 pg.).

English translation of abstract of CN101505469 (1 pg.).

Chinese Language International Search Report with Written Opinion, mailed Sep. 23, 2010, received in International Patent Application No. PCT/CN2010/073787, 8 pgs.

English Translation of International Search Report with Written Opinion, mailed Sep. 23, 2010, received in International Patent Application No. PCT/CN2010/073787, 8 pgs.

P.R. China, State Intellectual Property Office, Office Action for CN App. No. 200910139713.5, dated Aug. 15, 2013.

* cited by examiner

METHOD FOR REPORTING MEASUREMENT RESULTS IN CARRIER AGGREGATION AND USER EQUIPMENT

CROSS-REFERENCE TO RELATED APPLICATIONS

The subject application is a U.S. National Stage application of International Application No. PCT/CN2010/073787, filed on 11 Jun. 2010, which claims the priority of Chinese Patent Application No. 200910139713.5, filed on 24 Jun. 2009, the contents of which are herein incorporated by reference in its entirety.

FIELD OF THE INVENTION

The present invention relates to the technical field of mobile communication, and in particular to a method for reporting measurement results in carrier aggregation and a user equipment.

BACKGROUND OF THE INVENTION

In order to provide a higher data rate to mobile subscribers, the Advanced Lone Term Evolution system (Long Term Evolution Advance, "LTE-A" for short) proposes a carrier aggregation ("CA" for short) technology for the purpose of providing a wider bandwidth to User Equipments ("UE" for short) that have corresponding capability, and improving the peak rates for the UEs. In the LTE, the widest downlink transmission bandwidth supported by the system is 20 MHz. By carrier aggregation, two or more component carriers ("CC" for short) are aggregated to form a cell so as to enable the cell to support downlink transmission bandwidth wider than 20 MHz but not exceeding 100 MHz. A cell using the carrier aggregation technology is called a carrier-aggregation cell or a cell of carrier aggregation.

The component carriers in the cell of carrier aggregation can be divided into backward compatible component carriers and non-backward component carriers on the basis that whether they are compatible with the LTE. The non-backward component carrier only allows to be used by a UE supporting LTE-A technology. Not all of the component carriers need to broadcast system messages and paging messages, and not all of the component carriers have random access resources. When to access a carrier-aggregation cell, a UE can access the cell from any arbitrary chose component carrier having the random access resources. After the successful access, a base station can allocate other component carriers to the UE through dedicated signaling (e.g. Radio Resource Control ("RRC" for short) Connection Reconfiguration (RRC Connection Reconfiguration)) according to service requirements.

In a mobile communication system, in order to assure the service quality and provide good service experiences to users, after a UE in a certain cell establishes a connection with a network, the UE needs to measure the signal qualities of the serving cell and the neighboring cells to choose an appropriate cell to perform a handover, so as to satisfy the mobility requirement. Take the measurement within an LTE system in the LTE system as an example. The network instructs the UE to perform measurement by sending a measurement control message to the UE, wherein the measurement control message comprises: a measurement object ("MO" for short), the MO being a frequency of the LTE; a measurement report configuration (report configuration, "RC" for short), the RC configuring the attribute of a measurement report, for example, whether the measurement report being an event report or a periodical report, and corresponding configuration parameters; and a measurement ID ("MID" for short), the MID being an identity of each specific measurement task and associated with one MO and one RC so as to uniquely indicate one measurement task, i.e. uniquely indicating measurement configuration information on a certain frequency. In addition, the measurement control message further comprises a measurement threshold (s-Measure), which represents the signal quality threshold of a resident cell; a measurement quantity configuration (quantity configuration), which is configured to indicate a specific measurement quantity; and a measurement gap configuration, which is configured to perform inter-frequency and inter-RAT measurements during this measurement gap, etc. The UE can acquire the number of measurement tasks according to the number of the MIDs, and obtain the attributes of the measurement tasks according to the MOs and RCs corresponding to the MIDs, for instance, how to perform measurement and how to report.

The UE is required to measure the serving cell and the neighboring cells and report measurement objects that meet event triggered conditions, in order to satisfy the mobility requirement of the UE in a connected state, wherein measurement events for the serving cell mainly comprise: an A1 event, where the entry condition of the measurement event is that the signal quality of the serving cell exceeds a predetermined threshold; and an A2 event, where the entry condition of the measurement event is that the signal quality of the serving cell is lower than the predetermined threshold. And measurement events for the neighboring cells mainly comprise: an A3 event, where the entry condition of the measurement event is that the signal quality of a neighboring cell is higher than the signal quality of the serving cell by a predetermined offset; an A4 event, where the entry condition of the measurement event is that the signal quality of a neighboring cell exceeds a predetermined threshold; and an AS event, where the entry condition of the measurement event is that the signal quality of the serving cell is lower than a predetermined threshold 1 and the signal quality of the neighboring cell is higher than a predetermined threshold 2.

For the measurement of the above types of events satisfying the mobility requirement, the UE performs an event evaluation for the measurement result of each measurement object according to the measurement configuration parameters configured by the network, stores cells meeting the event entry conditions into a cell list corresponding to the measurement identity, and then acquires several cells (the number of reported cells should not exceed an upper threshold of the number of the reported cells as specified by the network) from the cell list corresponding to the measurement identity in an order according to signal qualities from strong to weak to generate a measurement report and to send the measurement report to the network.

As to the measurement of the measurement objects, different measurement quantities are measured in different systems. All of them reflect the signal quality or signal intensity of a cell. In the LTE, what is measured by the UE is Reference Signal Received Power ("RSRP" for short, unit of which is dBm) or Reference Signal Received Quality ("RSRQ" for short, unit of which is dB).

Each cell in a LTE system has only one frequency, thus it only needs to take a single frequency as the measurement object during the measurement. Correspondingly, during the event evaluation, it only needs to evaluate the signal quality of a cell on a single frequency (for example, A1, A2, A4 events) or evaluate the signal quality of neighboring cells with respect to a serving cell on a single frequency (for example, A3, A5 events); and it also only needs to take a cell on a single frequency as a processing object for measurement reporting and handover. However, as the carrier aggregation is introduced into the LTE-A, one cell using the carrier aggregation has a plurality of component carriers, then if the existing measurement mechanism in LTE is adopted, the measurement results on respective component carriers are reported independently, and the measurement results on respective component carriers received at the network are temporally discrete, i.e. the network cannot correctly and comprehensively evaluate the channel quality of the carrier-aggregation cell because the network can only acquire the measurement result on a single component carrier at one time point; thus when the UE performs handover between the cells of carrier aggregation, the service quality cannot be assured to satisfy good performance of user mobility between the carrier-aggregation cells.

SUMMARY OF THE INVENTION

In view of the above mentioned, the present invention provides a method for reporting a measurement result of carrier aggregation for solving the problem in the prior art that the network cannot correctly evaluate the channel quality of the carrier-aggregation cell because the network can only acquire the measurement result on a single component carrier.

According to one aspect of the present invention, a method for reporting a measurement result of carrier aggregation is provided.

The method for reporting the measurement result in carrier aggregation according to the present invention comprises: a user equipment reporting a measurement report which carries measurement results of part of or all of component carriers in a same carrier-aggregation cell.

According to another aspect of the present invention, a user equipment is provided.

The user equipment according to the present invention comprises: a receiving unit, a measurement and evaluation unit, and a reporting unit, wherein the receiving unit is configured to receive a measurement configuration sent from a base station, wherein the measurement configuration carries one or more measurement tasks, a measurement object of each measurement task is a component carrier or component carrier set of one or more carrier-aggregation cells that are serving cell and/or neighboring cell of the user equipment; the measurement and evaluation unit is configured to perform measurement and evaluation according to the measurement configuration received by the receiving unit; and the reporting unit is configured to report to the base station a measurement report which carries measurement results of a plurality of or all of component carriers in a same carrier-aggregation cell according to a measurement and evaluation result from the measurement and evaluation unit.

Through at least one solution above in the present invention, the base station configures the measurement object of each measurement task as a component carrier or component carrier set when sending the measurement configuration to the UE, the UE performs measurement and evaluation according to the measurement configuration, reports to the base station the measurement report which carries measurement results of a plurality of or all of component carriers of one and the same carrier-aggregation cell according to the measurement and evaluation result, so that the problem that the network cannot correctly evaluate the channel quality of the carrier-aggregation cell because the network can only acquire the measurement result on a single component carrier is solved, further assuring the service quality when the UE performs handover between cells of carrier aggregation, and satisfying good performance of UE mobility between the carrier-aggregation cells.

Other features and advantages of the present invention will be illustrated in the following Description and partially become obvious from the Description or understood by implementing the present invention. The object and other merits of the present invention will be accomplished and obtained via the structures particularly indicated in the Description, Claims and accompanying drawings.

BRIEF DESCRIPTION OF THE DRAWINGS

The accompanying drawings, constituting a part of the description for further understanding the present invention, illustrate the present invention together with the embodiments in the present invention, without limiting the present invention. In the drawings.

DETAILED DESCRIPTION OF EMBODIMENTS

In view of the problem in the traditional art that the network cannot correctly evaluate the channel quality of a carrier-aggregation cell because the network can only acquire the measurement result on a single component carrier, a solution for reporting the measurement result in carrier aggregation is provided in the embodiments of the present invention. In the embodiments of the present invention, when a base station sends a measurement configuration to a UE, it configures the measurement object (MO) of each measurement task (MID) to be a component carrier or a component carrier set of the serving cell of the UE or of a neighboring cell. And upon receiving the measurement configuration sent from the base station, the UE perform measurement and evaluation according to the measurement configuration, and reports to the base station a measurement report which carries the measurement results of a plurality of or all of component carriers of a same carrier-aggregation cell according to the measurement and evaluation result.

The embodiments and features therein of the present application can be combined with each other if no conflict is caused.

Next, the preferred embodiments of the present invention will be illustrated in detail with reference to the accompanying drawings. It should be indicated that the preferred embodiments described herein merely explain the present invention without limiting the present invention.

Firstly, a method for reporting measurement results in carrier aggregation is provided according to embodiments of the present invention.

Figure 1:
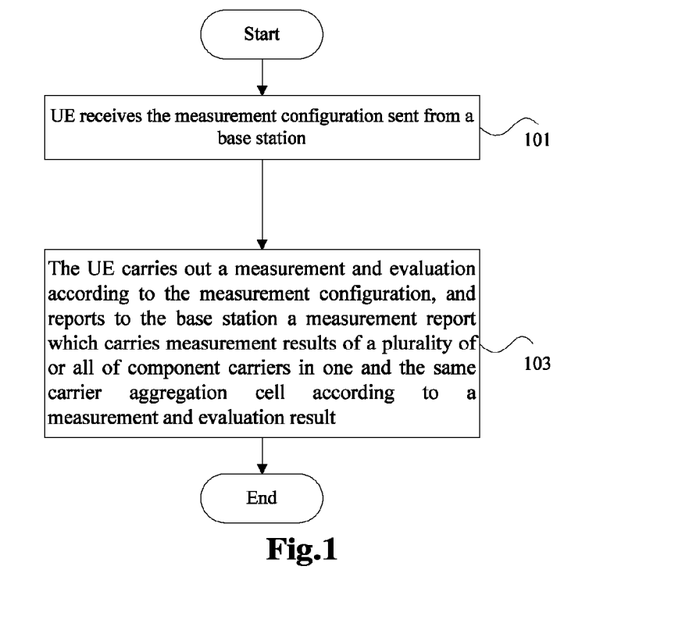
FIG. 1 is a flowchart of a method for reporting a measurement result of carrier aggregation according to an embodiment of the present invention.

FIG. 1 is a flowchart of the method for reporting the measurement result in carrier aggregation according to the embodiments of the present invention. As shown in FIG. 1, the method for reporting the measurement results in carrier aggregation according to the embodiments of the present invention comprises the following steps (step S101-step S103).

Step S101: a UE receives a measurement configuration sent from a base station, wherein the measurement configuration carries one or more measurement tasks, the measurement object of each measurement task is component carriers or component carrier sets of one or more carrier-aggregation cells, and the one or more carrier-aggregation cells are the serving cell and/or a neighboring cell(s) of the UE.

Specifically, the base station configures one measurement object for each measurement task (identified by the MID), and each measurement object can be one component carrier, or, each measurement object also can be one or more component carrier sets.

Step S103: the UE perform measurement and evaluation according to the above measurement configuration, and reports to the base station a measurement report which carries measurement results of a plurality of or all of component carriers of a same carrier-aggregation cell according to the measurement and evaluation result.

After receiving the measurement results of a plurality of or all of component carriers of a same carrier-aggregation cell reported by the UE, the base station can comprehensively evaluate the channel quality of the carrier-aggregation cell according to the measurement results of the plurality of or all of component carriers, so that the service quality can be ensured when the UE performs handover between the carrier-aggregation cells, and good performance of the user mobility between the carrier-aggregation cells is satisfied.

According to the method for reporting the measurement results in carrier aggregation provided in the embodiments of the present invention, the UE can report to the base station the measurement report which carries measurement results of a plurality of or all of component carriers of a same carrier-aggregation cell.

In the embodiments of the present invention, in the measurement configuration sent by the base station to the UE, the measurement object of each measurement task can be a component carrier, and also can be a component carrier set. Particularly in the embodiments of the present invention, the component carrier set refers to a universal set or a subset of all component carriers on a same frequency band in a carrier-aggregation cell (a serving cell or a neighboring cell), or a set of all component carriers in a carrier-aggregation cell.

The processing manners in the embodiments of the present invention will be different for the two types of measurement objects, i.e. the component carrier and the component carrier set. The technical solutions provided in the embodiments of the present invention will be illustrated taking the two types of measurement objects as examples.

Embodiment 1

In the present embodiment, a base station configures the measurement object in each measurement task to be a component carrier when configuring the measurement tasks for a UE.

Figure 2:
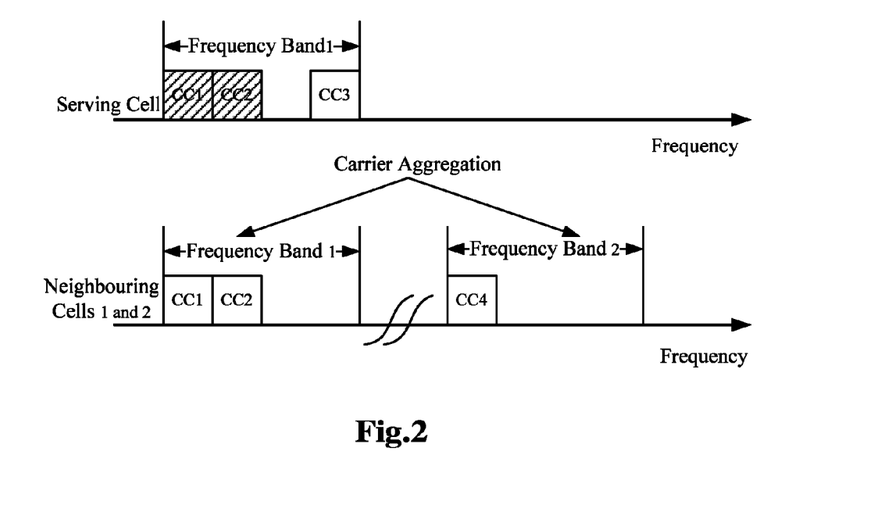
FIG. 2 is a schematic diagram of distribution of component carriers of each carrier-aggregation cell in Embodiment 1.

FIG. 2 is a schematic diagram of the distribution of component carriers of each carrier-aggregation cell in the present embodiment. As shown in FIG. 2, in the present embodiment, the UE capable of aggregating carriers camps on a serving cell of carrier aggregation. The serving cell supports aggregation of three component carriers CC1, CC2 and CC3 in total. All of the three component carriers are on a frequency band 1. CC1 and CC2 are contiguous, and CC3 is non-contiguous with the other two component carriers. A neighboring cell 1 and a neighboring cell 2 are the neighboring cells of the serving cell. Both the two neighboring cells are inter-band carrier-aggregation cells and support aggregation of three component carriers CC1, CC2 and CC4, where CC1 and CC2 are on the frequency band 1 and contiguous, and CC4 is on the frequency band 2.

After initiating a service, the UE successfully accesses the serving cell from CC1. After the successful access to the serving cell, the base station further allocates the component carrier CC2 to the UE, as the current traffic flow is quite large, i.e. the current UE simultaneously uses two component carriers CC1 and CC2. A set of the two component carriers can be referred to as a working carrier set or an active carrier set.

The base station configures the following measurement tasks for the UE through the measurement configuration (specifically can be contained in RRC connection reconfiguration signaling):

measurement task 1 (identified by MID1): the signal quality on the component carrier CC1 of the serving cell exceeds a predetermined threshold (an A1 event on CC1);

measurement task 2 (identified by MID2): the signal quality on the component carrier CC1 of the serving cell is lower than the predetermined threshold (an A2 event on CC1);

measurement task 3 (identified by MID3): the signal quality on the component carrier CC2 of the serving cell exceeds a predetermined threshold (an A1 event on CC2);

measurement task 4 (identified by MID4): the signal quality on the component carrier CC2 of the serving cell is lower than the predetermined threshold (an A2 event on CC2);

measurement task 5 (identified by MID5): the signal quality on the component carrier CC3 of the serving cell exceeds a predetermined threshold (an A1 event on CC3);

measurement task 6 (identified by MID6): the signal quality on CC1 of a neighboring carrier-aggregation cell or the signal quality on CC1 of a neighboring LTE cell (assuming herein that CC1 is backward compatible, and there is an LTE cell on CC1. The same assumption applies to the following text) is higher than the signal quality on the component carrier CC1 of the serving cell by a predetermined offset (an A3 event on CC1);

measurement task 7 (identified by MIDI): the signal quality on CC2 in a neighboring carrier-aggregation cell or the signal quality on CC2 in a neighboring LTE cell is higher than the signal quality on the component carrier CC2 in the serving cell by a predetermined offset (an A3 event on CC2); and measurement task 8 (identified by MID8): the signal quality on CC4 in the neighboring carrier-aggregation cell or the signal quality on CC4 in a neighboring LTE cell is higher than the signal quality on the component carrier CC1 in the serving cell by a predetermined offset (an A3 event on CC4).

Each measurement object in the measurement tasks listed above is a component carrier. Each component carrier of these measurement tasks identified by MID is configured with a different measurement event. In addition, besides of the measurement tasks above, the base station can also configure different events by taking respective component carriers as measurement objects, i.e. configuring other measurement tasks different from the above listed.

When configuring the above measurement tasks, the base station needs to inform the UE of the component carriers contained in each respective carrier-aggregation cell. A detailed implementation can be allocating an independent and unique Physical Cell Identity (PCI) to each carrier-aggregation cell (including serving cell and neighboring cell), i.e. allocating a same PCI for respective component carriers in each carrier-aggregation cell. In addition, a serving base station can also allocate one Cell ID to each carrier-aggregation cell (including serving cell and neighboring cell). The Cell Identity (Cell ID) of each carrier-aggregation cell is unique in the range of the base station, and the UE can determine the component carriers included in respective carrier-aggregation cells according to the Cell Identity (Cell ID).

The UE starts to measure the component carriers in each measurement task according to the above measurement configuration configured by the network, and performs event evaluation for measurement results on respective component carriers. Then the UE stores the measurement results of the component carriers of the carrier-aggregation cell or a measurement result (i.e. measurement quantity) of the LTE cell that meet the event entry conditions but are yet not stored in the cell list corresponding the measurement task into a cell list corresponding to the measurement task, and then constructs and reports the measurement report. For each measurement task configured by the network, as long as the measurement result on the component carrier of the carrier-aggregation cell of this measurement task meets the entry condition of the event of this measurement task, the UE needs to trigger the measurement report, and the measurement results on the other component carriers of the carrier-aggregation cell need to be simultaneously reported in the measurement report. In particular, for the serving cell, when the measurement object configured by the network is when the measurement result on the working component carrier of the serving cell in the measurement task of the working carrier meets the entry condition of the event, the measurement report reported by the UE can only simultaneously report the measurement results of the serving cell on the other working component carriers. The measurement results on the other component carriers of the carrier-aggregation cell can be the measured and evaluated results that meet the event entry condition and is stored in a corresponding cell list of the measurement tasks of the same category of the carrier-aggregation cell on the other component carriers, wherein the measurement tasks of the same category refer to the measurement tasks of which the event type configured in this measurement task is the same as the event type configured by the measurement task triggering this measurement report; besides, the measurement results on other component carriers of the carrier-aggregation cell still can be the last measurement results on the other component carriers of the carrier-aggregation cell reported by a physical layer to RRC and not event evaluated by the RRC before or when the measurement result on the component carrier of the carrier-aggregation cell meets the entry condition of event.

Next, specific measurement and report in the embodiment will be described through three examples.

Example 1

Assume that, at a certain time, in the measurement task 5, the signal quality on the component carrier CC3 of the serving cell meets the A1 event on CC3, the UE stores a measurement result on this component carrier into a cell list identified by the measurement task 5, i.e. the MID5, and constructs the measurement report. As the measurement task 5 is configured with the A1 event, and the UE has acquired, through a measurement configuration message, that CC1, CC2 and CC3 form a cell of carrier aggregation, the UE traverses cell lists corresponding to the measurement task 1 and the measurement task 3, and reports, in a measurement report identified by the MID5, the measurement results on the component carriers CC1 and CC2 of the serving cell stored in the cell lists corresponding to the measurement task 1 and the measurement task 3, in addition to a measurement result of the serving cell on the component carrier CC3 (assume herein that the signal qualities on the component carriers CC1 and CC2 of the serving cell have met the event conditions corresponding to the measurement task 1 and the measurement task 3. The same assumption applies to the following description. If the signal qualities on the component carriers CC1 and CC2 of the serving cell yet do not meet the event conditions corresponding to the measurement task 1 and the measurement task 3, the UE can only report the measurement result on the component carrier CC3 of the serving cell). Or, the UE traverses the last measurement results of CC1 and CC2 of the serving cell that currently have been reported by the physical layer to the RRC, and simultaneously reports, in the reported measurement report identified by the MID5, the last measurement results on CC1 and CC2 of the serving cell that have been reported by the physical layer to the RRC and have not been event evaluated by the RRC, in addition to the measurement result on the component carrier CC3 of the serving cell.

Example 2

Assume that, at a certain time, in the measurement task 1, the signal quality on the component carrier CC1 of the serving cell meets the A1 event on CC1, the UE stores the measurement result on this component carrier in a cell list identified by the measurement task 1, i.e. the MID1, and constructs the measurement report. As the measurement task 1 is configured with the A1 event, and the UE has acquired that CC1 and CC2 are working component carriers in the current serving cell after successfully accessing the serving cell, the UE traverses the cell list corresponding to the measurement task 3, and simultaneously reports, in a measurement report identified by the MID1, the measurement result on the working component carrier CC2 of the serving cell stored in the cell list corresponding to the measurement task 3, in addition to the measurement result of the serving cell on the working component carrier CC1. And possibly, the UE traverses the last measurement result on the working component carrier CC2 of the serving cell that currently has been reported by the physical layer to the RRC, and simultaneously reports, in the reported measurement report identified by the MID1, the last measurement result on working component carrier CC2 of the serving cell that has been reported by the physical layer to the RRC and has not been event evaluated by the RRC, in addition to the measurement result on the working component carrier CC1 of the serving cell.

Example 3

Assume that, at a certain time, in the measurement task 6, the signal quality on the component carrier CC1 of the neighboring carrier-aggregation cell 1 meets the A3 event on CC1, the UE stores a measurement result on this component carrier CC1 of the neighboring carrier-aggregation cell 1 into a cell list identified by the measurement task 6, i.e. the MID6, and constructs the measurement report. As the measurement task 6 is configured with the A3 event, and the UE has acquired, through a measurement configuration message, that CC1, CC2 and CC4 form a neighboring cell of carrier aggregation, the UE traverses cell lists corresponding to the measurement task 7 and the measurement task 8, and simultaneously reports, in the measurement report identified by the MID6, the measurement results on the component carriers CC2 and CC4 of the neighboring carrier-aggregation cell 1 stored in the cell lists corresponding to the measurement task 7 and the measurement task 8, in addition to the measurement result on CC1 of the neighboring carrier-aggregation cell 1. And possibly, the UE traverses the last measurement results on the component carriers CC2 and CC4 of the neighboring carrier-aggregation cell 1 that currently have been reported by the current physical layer to the RRC, and simultaneously reports, in the reported measurement report identified by the MID6, the last measurement results on CC2 and CC4 of the neighboring carrier-aggregation cell 1 that have been reported by the physical layer to RRC and have not been event evaluated by the RRC, in addition to the measurement result on CC1 of the neighboring carrier-aggregation cell 1.

Embodiment 2

In the present embodiment, a base station configures a measurement object in each measurement task as a component carrier when configuring the measurement task for a UE.

Figure 3:
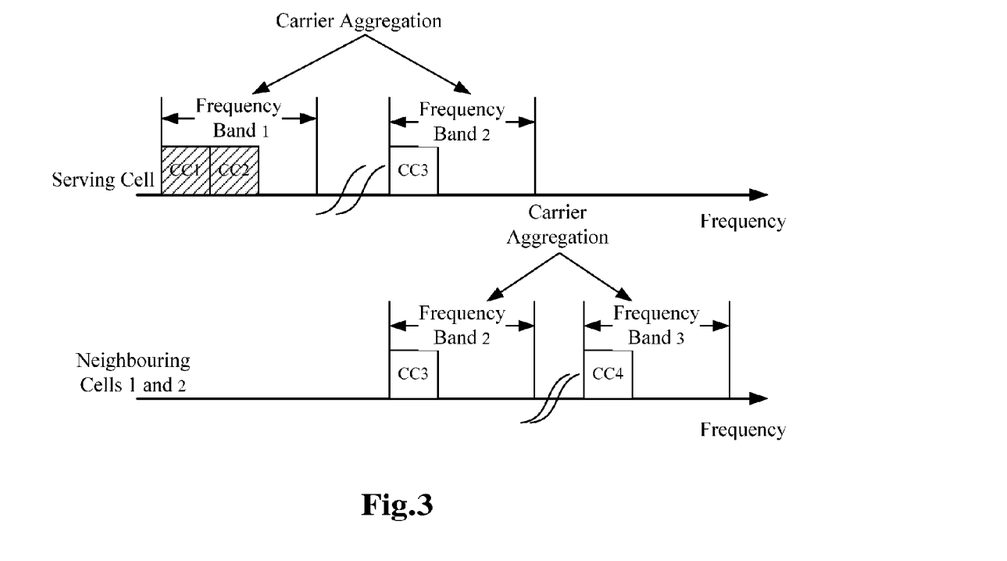
FIG. 3 is a schematic diagram of distribution of component carriers of each carrier-aggregation cell in Embodiment 2.

FIG. 3 is a schematic diagram of the distribution of component carriers of a serving cell and neighboring cells in the present embodiment. As shown in FIG. 3, the UE capable of aggregating carriers camps on the serving cell of carrier aggregation. The serving cell supports aggregation of three component carriers CC1, CC2 and CC3 in total, wherein CC1 and CC2 are on a frequency band 1 and are contiguous, and CC3 is on a frequency band 2. A neighboring cell 1 and a neighboring cell 2 are the neighboring cells of the serving cell. The two neighboring cells are inter-band carrier-aggregation cells, and support aggregation of two component carriers CC3 and CC4, wherein CC3 is on the frequency band 2, and CC4 is on a frequency band 3.

After initiating a service, the UE successfully accesses the serving cell from CC1. After the successful access to the serving cell, the base station further allocates the component carrier CC2 to the UE, as a current traffic flow is quite large, i.e. the current UE simultaneously uses two component carriers CC1 and CC2. In the present embodiment, the transmission characteristics, path losses, interference status, coverage ranges, etc. of CC1 and CC2 are quite close, and the base station therefore just judges and determines to choose to measure either CC1 or CC2 for a measurement satisfying the mobility requirement.

The base station configures the following measurement tasks for the UE through the measurement configuration (contained in RRC connection reconfiguration signaling):

measurement task 1 (identified by MID1): the signal quality on the component carrier CC1 of the serving cell exceeds a predetermined threshold (an A1 event on CC1);

measurement task 2 (identified by MID2): the signal quality on the component carrier CC1 of the serving cell is lower than the predetermined threshold (an A2 event on CC1);

measurement task 3 (identified by MID3): the signal quality on the component carrier CC3 of the serving cell exceeds the predetermined threshold (an A1 event on CC3);

measurement task 4 (identified by MID4): the signal quality on the component carrier CC1 of the serving cell is lower than a predetermined threshold 1 and the signal quality on the component carrier CC3 of a neighboring carrier-aggregation cell or the signal quality on CC3 of a neighboring LTE cell exceeds a predetermined threshold 2 (an A5 event on CC3); and measurement task 5 (identified by MID5): the signal quality on the component carrier CC1 of the serving cell is lower than the predetermined threshold 1 and the signal quality on the component carrier CC4 of the neighboring carrier-aggregation cell or the signal quality on CC3 of the neighboring LTE cell exceeds the predetermined threshold 2 (an A5 event on CC4).

The base station needs to inform the UE of the component carriers included in respective carrier-aggregation cells when configuring the above measurement tasks and the detailed implementation thereof can adopt the one described in Embodiment 1.

Similarly, the actions of the measurement evaluation and measurement report of the UE are also similar to those in Embodiment 1, and unnecessary details will not be given herein.

Next, a specific measurement report in the present embodiment will be described through two examples.

Example 1

Assume that, at a certain time, in the measurement task 1, the signal quality on the component carrier CC1 of the serving cell meets the A1 event on CC1, the UE stores the measurement result on the component carrier CC1 of the serving cell in a cell list identified by the measurement task 1, i.e. the MID1, and constructs a measurement report. As the measurement task 1 is configured with the A1 event, and the UE has acquired, through a measurement configuration message, that CC1, CC2 and CC3 form a cell of carrier aggregation, the UE traverses a cell list corresponding to the measurement task 3, and reports, in a measurement report identified by the MID1, a measurement result on the component carrier CC3 of the serving cell stored in the cell list corresponding to the measurement task 3, in addition to the measurement result of the serving cell on the component carrier CC1. Or, the UE traverses the last measurement result on CC3 of the serving cell that has been reported by the current physical layer to the RRC, and simultaneously reports, in the reported measurement report identified by the MID1, the last measurement result on CC3 of the serving cell that has been reported by the physical layer to the RRC and has not been event evaluated by the RRC, in addition to the measurement result of the serving cell on the component carrier CC1.

Example 2

Assume that, at a certain time, in the measurement task 4, the signal quality on the component carrier CC3 of a neighboring carrier-aggregation cell 1 meets the A3 event on CC3, the UE stores a measurement result on component carrier CC3 of the neighboring carrier-aggregation cell 1 into a cell list identified by the measurement task 4, i.e. the MID4, and constructs a measurement report. As the measurement task 4 is configured with the A3 event, and the UE has acquired, through a measurement configuration message, that CC3 and CC4 form a neighboring cell of carrier aggregation, the UE traverses a cell list corresponding to the measurement task 5, and simultaneously reports, in the measurement report identified by the MID4, the measurement result on the component carrier CC4 of the neighboring carrier-aggregation cell 1 stored in the cell list corresponding to the measurement task 5, in addition to the measurement result on the component carrier CC3 of the neighboring carrier-aggregation cell 1. Or, the UE traverses the last measurement result on the component carrier CC4 of the neighboring carrier-aggregation cell 1 that currently has been reported by the physical layer to the RRC and has not been event evaluated by the RRC.

Embodiment 3

In the present embodiment, when configuring a measurement task for a UE, a base station configures a measurement object in each measurement task as a component carrier set which specifically can be a component carrier set of one or more carrier-aggregation cells on one or more frequency bands.

Figure 4:
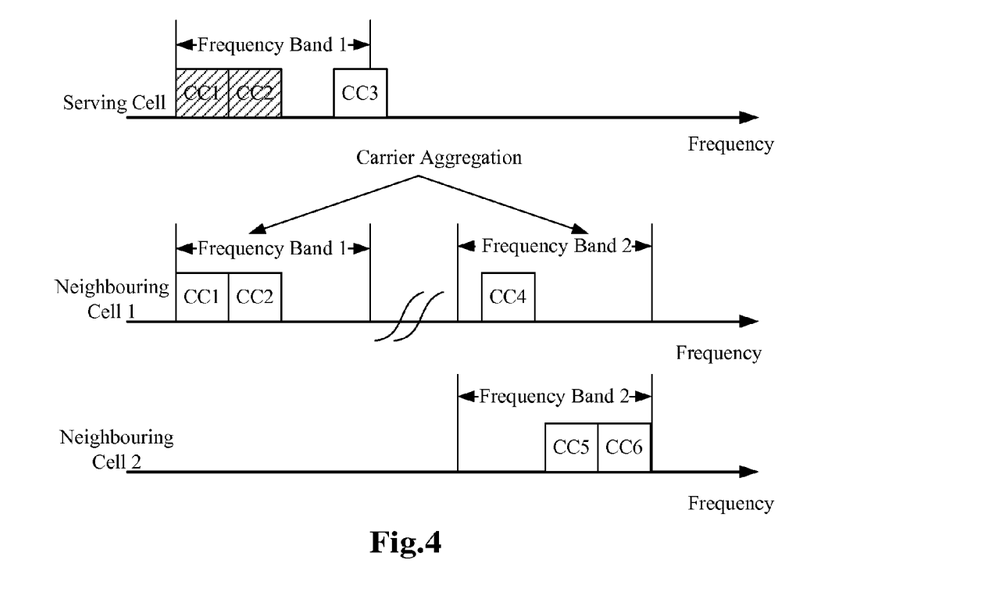
FIG. 4 is a schematic diagram of distribution of component carriers of each carrier-aggregation cell in Embodiment 3.

FIG. 4 is a schematic diagram of the distribution of component carriers of a serving cell and neighboring cells in the present embodiment. As shown in FIG. 4, the UE capable of aggregating carriers camps on the serving cell of carrier aggregation. The serving cell supports aggregation of three component carriers CC1, CC2 and CC3 in total. All of the three component carriers are on a frequency band 1, wherein CC1 and CC2 are contiguous, and CC3 is non-contiguous with the other two component carriers. A neighboring cell 1 and a neighboring cell 2 are the neighboring cells of the serving cell. The neighboring cell 1 is an inter-band carrier-aggregation cell and supports three component carriers CC1, CC2 and CC4, wherein CC1 and CC2 are on the frequency band 1 and are contiguous, and CC4 is on a frequency band 2. The neighboring cell 2 is a single-band carrier-aggregation cell and supports two component carriers CC5 and CC6 that are on the frequency band 2 and are contiguous.

After initiating a service, the UE successfully accesses the serving cell through CC1. After the successful access to the serving cell, the base station further allocates the component carrier CC2 to the UE, as a current traffic flow is quite large, i.e. the current UE simultaneously uses two component carriers CC1 and CC2. A set of the two component carriers on a same frequency band may be called a working carrier set or an active carrier set of the serving cell on this frequency band. As the properties such as transmission characteristics and path losses of respective component carriers on a same frequency band are similar, a set of component carriers in the carrier-aggregation cell on the same frequency band is taken as a measurement and evaluation object when the base station carries out a measurement configuration for the neighboring cells in the present embodiment. As to measurement configuration for the serving cell, the working carrier set of the serving cell on the same frequency band and all of the component carriers in the serving cell as well can be taken as a measurement and evaluation object according to different measurement purposes.

The base station configures the following measurement tasks for the UE through the measurement configuration (contained in an RRC connection reconfiguration signaling):

measurement task 1 (identified by MID1): signal qualities on the component carriers CC1 and CC2 of the serving cell both exceed a predetermined threshold, i.e. all the signal qualities on respective component carriers of the serving cell in the working carrier set on the frequency band 1 exceed the predetermined threshold. The measurement object in the present measurement task is a component carrier set formed by the working carriers in the serving cell on the frequency band 1;

measurement task 2 (identified by MID2): the signal qualities on the component carriers CC1 and CC2 of the serving cell are both lower than the predetermined threshold, i.e. all of the signal qualities on respective component carriers of the serving cell in the working carrier set on the frequency band 1 are lower than the predetermined threshold. The measurement object in the present measurement task is a component carrier set formed by the working carriers in the serving cell on the frequency band 1;

measurement task 3 (identified by MID3): the signal qualities on the component carrier CC3 of the serving cell exceeds the predetermined threshold. The measurement object in the present measurement task is a component carrier set formed by non-working carriers in the serving cell on the frequency band 1; and measurement task 4 (identified by MID4): all of the signal qualities on respective component carriers of the serving cell in the working carrier set on the frequency band 1 are lower than a predetermined threshold 1, and all of signal qualities on respective component carriers of a certain neighboring carrier-aggregation cell in the component carrier set on a certain frequency band are higher than a predetermined threshold 2. The measurement object in the present measurement task is a component carrier set of one or more neighboring carrier-aggregation cells on one or more frequency bands, and in the present embodiment specifically comprises: a component carrier set of the neighboring cell 1 on the frequency band 1 which includes the component carrier CC1 and the component carrier CC2, a component carrier set CC4 of the neighboring cell 1 on the frequency band 2, and a component carrier set of the neighboring cell 2 on the frequency band 2 which includes the component carrier CC5 and the component carrier CC6.

When configuring the above measurement tasks, the base station needs to inform the UE of the component carrier sets of respective carrier-aggregation cells on respective frequency bands, i.e. component carriers included in respective carrier-aggregation cells on respective frequency bands. A specific implementation can be allocating an independent and unique Physical Cell Identity (PCI) to the carrier-aggregation cell, i.e. allocating a same PCI for respective component carriers in the carrier-aggregation cell, by which the User Equipment can judge the component carriers included in respective carrier-aggregation cells on respective frequency bands when carrying out measurement and evaluation. Or, one Cell Identity (Cell ID) can be allocated to each carrier-aggregation cell, and the Cell Identity of each carrier-aggregation cell is unique in the range of the base station, and thereby the User Equipment can determine the component carriers included in respective carrier-aggregation cells on respective frequency bands when carrying out the measurement and evaluation. In addition, it should be indicated that, for the working carrier sets of the serving cell on respective frequency bands, the base station can inform the User Equipment using an RRC layer dedicated radio resource configuration signaling (contained in an RRC connection reconfiguration signaling), or a Media Access Control ("MAC" for short) layer signaling, or a Physical Downlink Control Channel ("PDCCH" for short) signaling before the measurement configuration. The dedicated radio resource configuration of the RRC layer is used in the present embodiment.

The UE starts to measure the component carriers on respective frequency bands according to the above measurement configuration configured by the network, and performs event evaluation for measurement results on the component carriers belonging to a same carrier-aggregation cell on respective frequency bands. Then the UE stores the measurement results on respective component carriers belonging to a same carrier-aggregation cell that meet the event entry conditions but yet are not stored in a cell list corresponding to the measurement task into the cell list corresponding to the measurement task, and then constructs and reports a measurement report. Taken the measurement task 4 as an example.

At a certain time, when the signal qualities on the component carriers CC1 and CC2 of the serving cell on the frequency band 1 are both lower than the predetermined threshold 1, and the signal qualities on the component carrier CC4 of the neighboring cell 1 on the frequency band 2 is higher than the predetermined threshold 2; besides, the signal qualities on the component carriers CC5 and CC6 of the neighboring cell 2 on the frequency band 2 are both higher than the predetermined threshold 2 too, then the UE stores the measurement result on CC4 of the neighboring cell 1 on the frequency band 2 and the measurement results on CC5 and CC6 of the neighboring cell 2 into a cell list identified by the measurement task 4, i.e. MID4, and constructs a measurement report in which the measurement result on CC4 of the neighboring cell and the measurement results on CC5 and CC6 of the neighboring cell 2 are reported.

All of the measurement objects in the measurement tasks listed above are a universal set or a subset of all of the component carriers in a carrier-aggregation cell on one and the same frequency band, and the above measurement tasks identified by the MIDs configure different measurement events for a set of these component carriers. Besides, these measurement tasks are only part of the measurement tasks possibly configured by the base station, while the base station further can configure different events by taking the universal set or subset of all of the component carriers on one and the same frequency band as the measurement object, i.e. configuring other measurement tasks different from the above listed.

In the above measurement tasks, the measurement task 1 and measurement task 2 can provide for the network with a criterion for judging whether to start or to close the measurement task 3. In addition to the above measurement tasks, the network further can configure the following measurement tasks for the User Equipment in order to provide for the network with the criterion for judging whether to start a neighboring cell measurement.

measurement task 5 (identified by MID5): all of signal quality on all of the component carriers of the serving cell are lower than the predetermined threshold; and measurement task 6 (identified by MID6): all of signal qualities intensities on all of the component carriers of the serving cell are higher than the predetermined threshold.

Similarly, the base station needs to inform the User Equipment of the component carriers included in the serving cell when configuring the above measurement tasks and the detailed implementation thereof can adopt the one described in Embodiment 1.

The User Equipment performs a measurement and evaluation for the measurement results on all of component carriers of the serving cell. When all of the signal qualities on all of the component carriers of the serving cell are lower than or higher than the predetermined threshold, the User Equipment reports to the base station the measurement report which may carry the measurement results on all of the component carriers of the serving cell and may also only carry MID information by which the network can judge whether the signal qualities on all of the component carriers of the serving cell are lower than or higher than the predetermined threshold, and the network can use this as a criterion for judging whether to start a neighboring cell measurement, i.e. whether to configure a neighboring cell measurement task for the UE.

Embodiment 4

In the present embodiment, when configuring a measuring task for a UE, a base station configures a measurement object in each measurement task as a component carrier set that specifically can be a component carrier set of one or more carrier-aggregation cells on one or more frequency bands.

Figure 5:
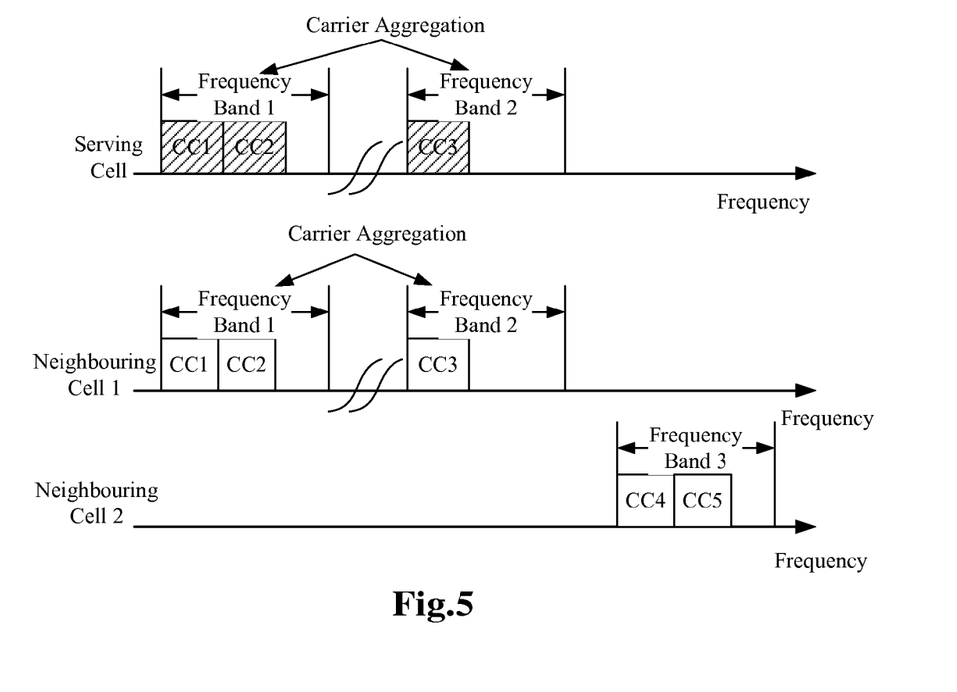
FIG. 5 is a schematic diagram of distribution of component carriers of each carrier-aggregation cell in Embodiment 4.

FIG. 5 is a schematic diagram of the distribution of component carriers in a serving cell and neighboring cells in the present embodiment. As shown in FIG. 5, the UE capable of aggregating carriers camps on the serving cell of carrier aggregation. The serving cell supports aggregation of three component carriers CC1, CC2 and CC3 in total, wherein CC1 and CC2 are on a frequency band 1 and are contiguous, and CC3 is on a frequency band 2. A neighboring cell 1 and a neighboring cell 2 are the neighboring cells of the serving cell. The neighboring cell 1 is an inter-band carrier-aggregation cell and supports three component carriers CC1, CC2 and CC3, wherein CC1 and CC2 are on the frequency band 1 and are contiguous, and CC3 is on the frequency band 2. The neighboring cell 2 is a single-band carrier-aggregation cell and supports two component carriers CC4 and CC5 that are on a frequency band 3 and contiguous.

After initiating a service, the UE successfully accesses the serving cell through CC1. After the successful access to the serving cell, the base station further allocates the component carriers CC2 and CC3 to the UE, as a current service flow is quite large, i.e. the current UE simultaneously uses three component carriers CC1, CC2 and CC3. CC1 and CC2 belong to the frequency band 1, and a set of the two component carriers is called a working carrier set or an active carrier set of the serving cell on this frequency band. If a plurality of working carriers are present on the frequency band 2, they are correspondingly called a working carrier set or an active carrier set of the serving cell on the frequency band 2. As the properties such as transmission characteristics and pathloss of respective component carriers on a same frequency band are similar, a set of component carriers in the carrier-aggregation cell on the same frequency band is taken as a measurement and evaluation object when the base station carries out a measurement configuration for the neighboring cells in the present embodiment. As to a measurement configuration for the serving cell, the working carrier set of the serving cell on the same frequency band and all of the component carriers in the serving cell as well can be taken as a measurement and evaluation object according to different measurement purposes.

The base station configures the following measurement tasks for the UE through the measurement configuration (contained in an RRC connection reconfiguration signaling):

measurement task 1 (identified by MID1): signal qualities on the component carriers CC1 and CC2 of the serving cell both exceed a predetermined threshold, i.e. all the signal qualities on respective component carriers of the serving cell in the working carrier set on the frequency band 1 exceed the predetermined threshold. The measurement object in the present measurement task is a component carrier set formed by the working carriers in the serving cell on the frequency band 1;

measurement task 2 (identified by MID2): the signal qualities on the component carriers CC1 and CC2 of the serving cell are both lower than the predetermined threshold, i.e. all of the signal qualities on respective component carriers of the serving cell in the working carrier set on the frequency band 1 are lower than the predetermined threshold. The measurement object in the present measurement task is a component carrier set formed by the working carriers in the serving cell on the frequency band 1;

measurement task 3 (identified by MID3): a signal quality of the serving cell on the component carrier CC3 exceeds the predetermined threshold, i.e. all of signal qualities on respective component carriers of the serving cell in the working carrier set on the frequency band 2 exceed the predetermined threshold. The measurement object in the present measurement task is a component carrier set formed by working carriers in the serving cell in the frequency band 2;

measurement task 4 (identified by MID4): a signal quality of the serving cell on the component carrier CC3 is lower than the predetermined threshold, i.e. all of signal qualities on respective component carriers of the serving cell in the working carrier set on the frequency band 2 are lower than the predetermined threshold. The measurement object in the present measurement task is a component carrier set formed by working carriers in the serving cell in the frequency band 2;

measurement task 5 (identified by MID5): all of the signal qualities on respective component carriers of the serving cell in the working carrier set on the frequency band 1 are lower than a predetermined threshold 1, and all of signal qualities on respective component carriers of a certain neighboring carrier-aggregation cell in a component carrier set on a certain frequency band are higher than a predetermined threshold 2. The measurement object in the present measurement task is a component carrier set of one or more neighboring carrier-aggregation cells on one or more frequency bands, and specifically in the present embodiment it comprises: a component carrier set of the neighboring cell 1 on the frequency band 1, which includes the component carrier CC1 and the component carrier CC2, a component carrier set CC3 of the neighboring cell 1 on the frequency band 2, and a component carrier set of the neighboring cell 2 on the frequency band 3, which includes the component carrier CC4 and the component carrier CC5;

measurement task 6 (identified by MID6): all of signal qualities on respective component carriers of the serving cell in the working carrier set on the frequency band 2 are lower than the predetermined threshold 1, and all of signal qualities on respective component carriers of a certain neighboring carrier-aggregation cell in a component carrier set on a certain frequency band are higher than the predetermined threshold 2. The measurement object in the present measurement task is the same as that in the measurement task 5.

When configuring the above measurement tasks, the base station needs to inform the UE of the component carrier sets of respective carrier-aggregation cells on respective frequency bands, i.e. component carriers included in respective carrier-aggregation cells on respective frequency bands. A specific configuring method is the same as that in Embodiment 3, and unnecessary details will not be given herein.

The actions of the measurement evaluation and measurement report of the UE are similar to those in Embodiment 3, and unnecessary details will not be given herein.

A User Equipment is further provided according to an embodiment of the present invention.

Figure 6:
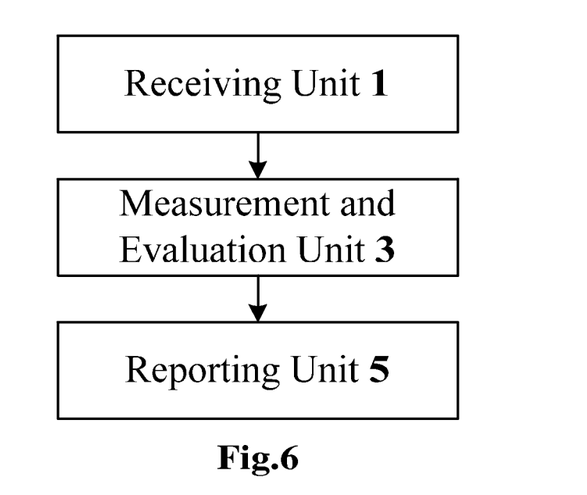
FIG. 6 is a structure schematic diagram of a User Equipment according to an embodiment of the present invention.

FIG. 6 is a structure schematic diagram of a User Equipment according to an embodiment of the present invention. As shown in FIG. 6, the User Equipment according to the embodiment of the present invention mainly comprises: a receiving unit 1, a measurement and evaluation unit 3 and a reporting unit 5. The receiving unit 1 is configured to receive a measurement configuration sent from a base station, and wherein the measurement configuration carries one or more measurement tasks, and the measurement object of each measurement task is a component carrier or component carrier set of one or more carrier-aggregation cells that are serving cell and/or neighboring cell of the User Equipment. The measurement and evaluation unit 3, connected with the receiving unit 1, is configured to perform measurement and evaluation according to the measurement configuration received by the receiving unit 1. The reporting unit 5, connected with the measurement and evaluation unit 3, is configured to report to the base station a measurement report which carries measurement results of a plurality of or all of component carriers in a same carrier-aggregation cell according to a measurement and evaluation result from the measurement and evaluation unit 3.

Further, the receiving unit 1 is further configured to receive a notification sent from the base station of the component carriers included in respective carrier-aggregation cells of the one or more carrier-aggregation cells on respective frequency bands, and/or all of component carriers included in respective carrier-aggregation cells. Specifically, the base station can inform the UE of the component carriers included in respective carrier-aggregation cells on respective frequency bands, and/or all of the component carriers included in respective carrier-aggregation cells by allocating an independent and unique Physical Cell Identity ("PCI" for short) to each carrier-aggregation cell (including serving cell and neighboring cell). Or, the base station can also inform the UE of the component carriers included in respective carrier-aggregation cells on respective frequency bands, and/or all of the component carriers included in respective carrier-aggregation cells by allocating a Cell Identity (Cell ID) to each carrier-aggregation cell (including serving cell and neighboring cell).

As mentioned above, by the technical solutions provided in the embodiments of the present invention, the serving base station, when sending the measurement configuration to the UE, configures the measurement object of each measurement task as the component carrier or component carrier set, the UE carries out the measurement and evaluation according to the measurement configuration, and reports to the serving base station the measurement report which carries measurement results of a plurality of or all of component carriers in a same carrier-aggregation cell according to the measurement and evaluation result, so that the problem that the network cannot correctly evaluate the channel quality of the carrier-aggregation cell because the network can only acquire the measurement result on a single component carrier is solved, further assuring the service quality when UE performs handover between the cells of carrier aggregation, and satisfying a good performance of the UE mobility between the carrier-aggregation cells.

Above description is only to illustrate the preferred embodiments but not to limit the present invention. For the person skilled in the art, various alterations and changes may be made to the present invention. Any modification, equivalent substitution and improvement within the spirit and principle of the present invention shall be covered in the scope of protection of the present invention.

The invention claimed is:

1. A method for reporting measurement results in carrier aggregation, comprising:
    a user equipment receiving a measurement configuration sent from a base station, wherein the measurement configuration carries a plurality of measurement tasks to be performed on a plurality of component carriers of a carrier-aggregation cell;
    the user equipment performing the plurality of measurement tasks on each and every one of the plurality of component carriers configured in the measurement configuration, wherein measurement on at least one of the plurality of component carriers triggers measurement reporting; and
    the user equipment sending to the base station a single measurement report, wherein the single measurement report carries both result from the measurement triggering the measurement reporting and result from other measurement on at least one other component carrier of the plurality of component carriers of the carrier-aggregation cell.

2. The method according to claim 1, wherein the method further comprises:
    the base station informing the user equipment of component carriers on respective frequency bands included in respective carrier-aggregation cells of the one or more carrier-aggregation cells, and/or all of component carriers included in respective carrier-aggregation cells of the one or more carrier-aggregation cells.

3. The method according to claim 2, wherein the base station informs the user equipment in a manner as follow:
the base station allocating an independent and unique physical cell identity to each carrier-aggregation cell; or
the base station allocating a cell identity to each carrier-aggregation cell.

4. The method according to claim 1, wherein the result from measurement on at least one different component carrier of the plurality of component carriers of the carrier-aggregation cell comprises:
measurement results on at least one different component carrier of the carrier-aggregation cell that have met event entry conditions and stored in a corresponding cell list, in measurement tasks of a same category; and/or
last measurement results on at least one different component carriers of the carrier-aggregation cell that have been reported by the physical layer to a radio resource control entity RRC and have not been performed the event evaluation by the RRC, when or before the measurement result on the at least one of the plurality of component carriers triggers the measurement reporting.

5. A method for reporting measurement results in carrier aggregation, comprising:
a user equipment receiving a measurement configuration sent from a base station, wherein the measurement configuration carries a plurality of measurement tasks to be performed on a plurality of component carrier sets, wherein each of the plurality of component carrier sets comprises a universal set or a subset of all component carriers of a carrier-aggregation cell on a same frequency band, or a set of all component carriers in the carrier-aggregation cell, wherein each of the plurality of component carrier sets comprises more than one component carrier;
the user equipment performing the plurality of measurement tasks on the plurality of component carrier sets in the measurement configuration, wherein measurement on each and every component carrier of one of the plurality of component carrier sets triggers measurement reporting; and
the user equipment sending to the base station a single measurement report, wherein the single measurement report carries both result from the measurement triggering the measurement reporting and result from other measurement on at least one other component carrier of the plurality of component carriers of the carrier-aggregation cell.

6. The method according to claim 1, wherein the carrier-aggregation cell comprises a serving cell of the user equipment or a neighboring cell of the serving cell.

7. A user equipment, comprising:
a receiving unit, configured to receive a measurement configuration sent from a base station, wherein the measurement configuration carries a plurality of measurement tasks to be performed on a plurality of component carriers of a carrier-aggregation cell;
a measurement and evaluation unit, configured to perform the plurality of measurement tasks on each and every one of the plurality of component carriers configured in the measurement configuration, wherein measurement on at least one of the plurality of component carriers triggers measurement reporting; and
a reporting unit, configured to send to the base station a single measurement report,
wherein the single measurement report carries both result from the measurement triggering the measurement reporting and result from other measurement on at least one other component carrier of the plurality of component carriers of the carrier-aggregation cell.

8. The user equipment according to claim 7, wherein the receiving unit is further configured to receive a notification, sent from the base station, of component carriers included in respective carrier-aggregation cells of the one or more carrier-aggregation cells on respective frequency bands, and/or all of component carriers included in the respective carrier-aggregation cells.

9. The method according to claim 5, wherein before the user equipment sends to the base station a single measurement report, the method further comprises:
the user equipment performing an event evaluation for measurement results on all of or part of the component carriers belonging to a same carrier-aggregation cell and on a same frequency band, or the user equipment carrying out an event evaluation for measurement results on all the component carriers of the carrier-aggregation cell.

10. The method according to claim 5, wherein the carrier-aggregation cell comprises a serving cell of the user equipment or a neighboring cell of the serving cell.

* * * * *